United States Patent
Nagae et al.

(10) Patent No.: US 9,581,045 B2
(45) Date of Patent: *Feb. 28, 2017

(54) SHEET METAL TURBINE HOUSING

(75) Inventors: Satomi Nagae, Tokyo (JP); Daigo Watanabe, Tokyo (JP); Motoki Ebisu, Tokyo (JP); Michio Kyoya, Sagamihara (JP); Toru Kikuchi, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/700,982

(22) PCT Filed: Dec. 7, 2011

(86) PCT No.: PCT/JP2011/078299
§ 371 (c)(1),
(2), (4) Date: Feb. 26, 2013

(87) PCT Pub. No.: WO2012/077711
PCT Pub. Date: Jun. 14, 2012

(65) Prior Publication Data
US 2013/0156567 A1 Jun. 20, 2013

(30) Foreign Application Priority Data
Dec. 9, 2010 (JP) ................. 2010-274369

(51) Int. Cl.
*F01D 25/24* (2006.01)
*F01D 9/02* (2006.01)
(Continued)

(52) U.S. Cl.
CPC ............ *F01D 25/24* (2013.01); *F01D 9/026* (2013.01); *F02B 37/02* (2013.01); *F02B 39/00* (2013.01);
(Continued)

(58) Field of Classification Search
CPC ...... F01D 9/026; F01D 25/24; F01D 2230/54; F01D 2230/232; F01D 25/26; Y02T 50/671; F02B 39/00
(Continued)

(56) References Cited

U.S. PATENT DOCUMENTS 5,112,190 A * 5/1992 Kajiwara et al. .......... 415/215.1
7,074,009 B2 * 7/2006 Allmang et al. ............ 415/177
(Continued)

FOREIGN PATENT DOCUMENTS

CN 1493771 A 5/2004
DE 10022052 A1 3/2001
(Continued)

OTHER PUBLICATIONS

International Preliminary Report on Patentability and Written Opinion of the International Searching Authority for International Application No. PCT/JP2011/078299, dated Jun. 20, 2013 with English translation.
(Continued)

*Primary Examiner* — Nicholas J Weiss
*Assistant Examiner* — Jason T Newton
(74) *Attorney, Agent, or Firm* — Birch, Stewart, Kolasch & Birch, LLP (57) ABSTRACT

The turbine housing 1 is formed by sheet metal scroll members 5 and 7 butted opposite each other and welded together. A center core part 9 arranged in a central part of the scroll part 3 is integrally formed in one piece from a steel pipe member such as to include a housing portion 93 surrounding a turbine wheel 24, a bearing receiving portion 91 axially supporting the turbine wheel 24, and a plurality of circumferentially spaced supports 92 bridging a gap between the housing portion 93 and the bearing receiving portion 91.

10 Claims, 5 Drawing Sheets

(51) Int. Cl.
*F02B 37/02* (2006.01)
*F02B 39/00* (2006.01)

(52) U.S. Cl.
CPC .... *F05D 2220/40* (2013.01); *F05D 2230/232* (2013.01); *F05D 2230/54* (2013.01); *Y02T 50/671* (2013.01)

(58) Field of Classification Search
USPC ..... 30/602; 415/200, 204–206, 212.1, 215.1, 415/229
See application file for complete search history.

(56) References Cited

U.S. PATENT DOCUMENTS

| | | | | |
|---|---|---|---|---|
| 9,194,292 | B2 * | 11/2015 | Yokoyama | F01D 25/24 |
| 2002/0085932 | A1 * | 7/2002 | Loffler et al. | 417/407 |
| 2003/0206798 | A1 | 11/2003 | Allmang et al. | |
| 2004/0057847 | A1 | 3/2004 | Wild | |
| 2006/0133931 | A1 | 6/2006 | Burmester et al. | |
| 2009/0220335 | A1 | 9/2009 | Matsuo et al. | |
| 2010/0098533 | A1 * | 4/2010 | Grussmann et al. | 415/203 |
| 2010/0199628 | A1 * | 8/2010 | Berry et al. | 60/39.091 |
| 2010/0316494 | A1 * | 12/2010 | Gru mann et al. | 415/231 |
| 2011/0274542 | A1 | 11/2011 | Inoshita et al. | |
| 2012/0023928 | A1 * | 2/2012 | Smatloch et al. | 60/598 |
| 2012/0051899 | A1 * | 3/2012 | Petitjean et al. | 415/205 |

FOREIGN PATENT DOCUMENTS

| | | | | |
|---|---|---|---|---|
| DE | 10 2004 039 477 | A1 | 2/2006 | |
| EP | 0374603 | A1 | 6/1990 | |
| EP | 1 357 278 | A2 | 10/2003 | |
| EP | 2 096 264 | A2 | 9/2009 | |
| GB | 2 035 467 | A | 6/1980 | |
| JP | 59-73503 | U | 5/1984 | |
| JP | 7-150961 | A | 6/1995 | |
| JP | 2003-314290 | A | 11/2003 | |
| JP | 2003-536009 | A | 12/2003 | |
| JP | 2004-132366 | A | 4/2004 | |
| JP | 2006-161573 | A | 6/2006 | |
| JP | 2006-527322 | A | 11/2006 | |
| JP | 2007-120396 | A | 5/2007 | |
| JP | 2008-57448 | A | 3/2008 | |
| JP | 2008-106667 | A | 5/2008 | |
| JP | 2008-121470 | A | 5/2008 | |
| JP | 2009-209701 | A | 9/2009 | |
| JP | 2010-163966 | A | 7/2010 | |
| JP | WO 2011078035 | A1 * | 6/2011 | F01D 25/24 |
| WO | WO 2007/135449 | A1 | 11/2007 | |
| WO | WO 2009/065881 | A1 | 5/2009 | |
| WO | WO 2010/082119 | A2 | 7/2010 | |
| WO | WO 2011/095892 | A2 * | 8/2011 | C12N 9/24 |

OTHER PUBLICATIONS

Chinese Office Action, dated May 5, 2014, for Chinese Applciation No. 201180029675.3, including an English Translation.
Decision to Grant a Patent, dated May 22, 2015, issued in corresponding Japanese Patent Application No. 2010-274369, including an English translation.
Chinese Office Action, dated Nov. 25, 2014, issued in corresponding Chinese Application No. 201180029675.3, including an English translation.
Chinese Notice of Allowance, dated Nov. 6, 2015, issued in corresponding Chinese Application No. 201180029675.3 (with an English translation).
Chinese Notice of Allowance, issued Mar. 2, 2015, for Chinese Application No. 201080029321.4, along with an English translation.
Extended European Search Report, issued Jun. 11, 2014, for European Application No. 10839268.9.
Japanese Notice of Allowance, issued Aug. 6, 2013, for Japanese Application No. 2009-289414, along with an English translation.
Korean Notice of Allowance, issued Sep. 5, 2013, for Korean Application No. 10-2011-7031317, along with an English translation.

* cited by examiner

SHEET METAL TURBINE HOUSING

TECHNICAL FIELD

The present invention relates to a sheet metal turbine housing employed in a turbocharger that sends compressed air to the engine by using the energy of exhaust gas from the engine, and more particularly to the surrounding structure of a center core part of the turbine housing.

BACKGROUND ART

Figure 9:
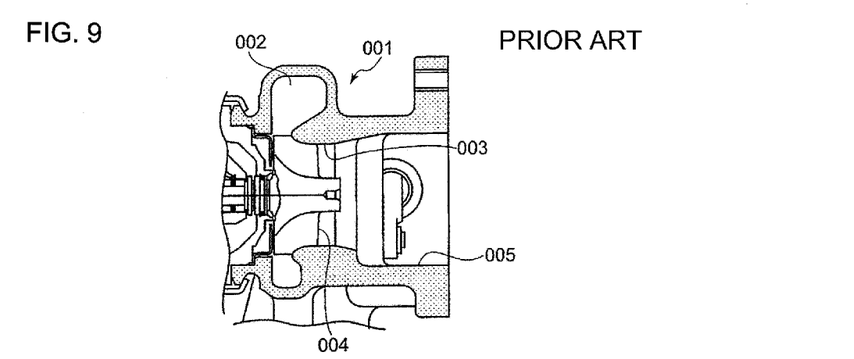
FIG. 9 is a diagram for explaining a conventional technique in which the housing portion is made by casting.

A conventional turbine housing 001 includes, as shown in FIG. 9, a scroll part 002, a core part 003 surrounding the outer circumference of a turbine wheel 004, and an outlet part 005 leading to an exhaust gas flow passage, these being formed integrally by casting. As it is made by casting, the turbine housing is thick in various parts and has high heat capacity, because of which, when disposed upstream of an exhaust gas purification catalyst, the housing impedes the warming of the catalyst. In view of more stringent exhaust gas regulations in recent years, it is important to reduce the heat capacity of the housing by making it from sheet metal so that it is thinner and lighter, so as to improve the purification performance of the catalyst by speeding up the warming and activation of the catalyst.

Since sheet metal parts are thin and less strong, a turbine housing made of sheet metal requires a coupling portion for coupling a part on the side of a bearing housing in which a bearing that supports a rotating shaft of the turbine blade is fitted and a part on the side of the outlet leading to the exhaust gas flow passage.

Figure 10:
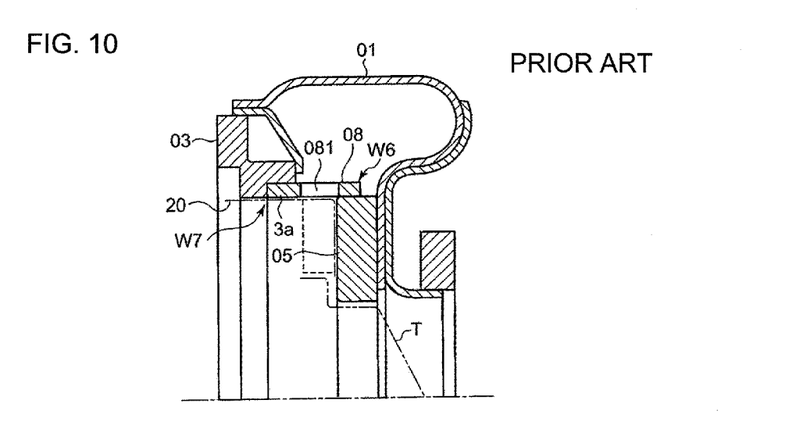
FIG. 10 is a schematic configuration diagram of major parts of a conventional sheet metal turbine housing.

FIG. 10 shows a conventional technique regarding this coupling portion described in Patent Document 1 (Japanese Patent Application Laid-open No. 2008-106667).

A coupling ring 08 having a plurality of circumferentially arranged columnar coupling portions 081 is disclosed, as shown in FIG. 10. A flange 03 on the bearing housing side, a flange 05 on the nozzle wall surface, and the coupling ring 08 are fabricated as separate components. The coupling ring 08 and the flange 05 on the nozzle wall surface are welded together all around (W6), and the coupling ring 08 and the flange 03 on the bearing housing side are welded together all around (W7).

As the flange 03 on the bearing housing side, the flange 05 on the nozzle wall surface, and the coupling ring 08 are fabricated as separate components and welded together all around, the cost is increased because of the increased number of components. Moreover, an ample clearance needs to be formed between the housing portion and the turbine, in consideration of the amount of thermal strain that accompanies the welding of the entire circumference. A large clearance is problematic because it lowers the driving performance of the turbine, and results in poorer turbocharger performance.

Another problem is that, while the turbine housing can be made more lightweight by making it from sheet metal, a sheet metal housing will likely have lower strength. Therefore, the turbine housing needs a structure that provides impact resistance so that, in the event of a burst following an excessively high-speed rotation of the turbine rotor under some circumstances, fractured pieces will not fly off.

Patent Document 1: Japanese Patent Application Laid-open No. 2008-106667

DISCLOSURE OF THE INVENTION

The present invention was made in view of these problems. Objects of the invention are to prevent changes in tip clearance caused by thermal deformation of the scroll main body, to reduce weight and cost of the turbine housing, and to improve durability and reliability of the turbine and impact resistance of the turbine housing, by forming a center core part that is disposed at the center of a scroll part of a turbocharger in one piece from a steel pipe member to include a flow passage outlet part, a bearing receiving portion, and supports.

To achieve the above object, the present invention resides in a sheet metal turbine housing mounted downstream of an engine exhaust manifold and having a scroll part made by a sheet metal scroll member to form a spiral exhaust gas passage of a turbocharger that drives a turbine by using exhaust gas, the sheet metal turbine housing including: a center core part disposed in a central part of the scroll part and including a housing portion at one end surrounding the turbine, a bearing receiving portion at the other end in which a bearing axially supporting the turbine is fitted, and a plurality of circumferentially spaced supports bridging a gap between the housing portion and the bearing receiving portion in an axial direction of the turbine; the housing portion, the bearing receiving portion, and the supports being formed in one piece from a steel pipe member in an annular shape.

As compared to the conventional center core formed by the flange on the bearing housing side, the flange on the nozzle wall surface, and the coupling ring fabricated separately and welded together, the center core is formed in one piece from a steel pipe member in an annular shape. Such a structure allows for a reduction in material thickness and thermal capacity of the turbine part so that it can heat up quickly to promote the warming of an exhaust gas purification system, and thus enables efficient purification processing by the exhaust gas purification system.

Aside from being made more lightweight, the steel pipe turbocharger can be produced at lower cost than the conventional center core.

As the center core is formed in one piece from a steel pipe member to include parts corresponding to the flange on the bearing housing side, the nozzle wall surface, and the coupling ring, there is no need to take account of thermal strain that accompanies the process of welding together separate components, and the clearance between the housing portion and the turbine can be made smaller. Thereby, a reduction in the turbine driving performance caused by a large tip clearance can be avoided.

As the center core part is a one-piece article made from a steel pipe member, it can have higher strength than a cast structure with a complex shape, and can have higher impact resistance as it is made of steel pipe.

In the present invention, preferably, the supports may have a cross-sectional shape, as viewed from the axial direction of the turbine, with acute-angled corners both upstream and downstream of a flow of exhaust gas so that the supports have an upstream side face and a downstream side face inclined along the flow of gas.

Exhaust gas flows spirally through the scroll part toward the center into the turbine part. With the structure described above, as the supports have side faces that extend along the flow of exhaust gas, the supports cause less flow resistance in the gas passage and so the rotation efficiency of the turbine blade can be improved.

The supports have a cross-sectional area that is necessary to secure sufficient rigidity and strength to couple a part on the bearing housing side and a part on the flow passage outlet side surrounding the turbine blade and to maintain the clearance between them and the turbine blade constant.

In the present invention, preferably, the scroll part may have a first sheet metal scroll part fixedly attached to the housing portion at the one end and a second sheet metal scroll part fixedly attached to the bearing receiving portion at the other end, and the first scroll part and the second scroll part may be joined together by penetration butt welding at an outer circumferential portion of the scroll part.

Since the scroll part is subjected to tensile stress and bending force by the pulsed exhaust gas flows, such a structure adopting penetration butted welding that is advantageous in withstanding the bending force can provide the effects of improving the durability and reliability of the turbine housing due to its increased strength, and of making the welding work easier because the weld joint is along the outer circumference of the scroll part.

In the present invention, preferably, the housing portion surrounding the turbine may have a larger sheet thickness in a portion facing an outer circumference of the turbine than in other portions.

With the housing portion having a larger sheet thickness in a portion facing the outer circumference of the turbine than in other portions, the turbine housing will have better impact resistance in the event of a burst following an excessively high-speed rotation of the turbine rotor, as the housing portion will suffer minimum damage from flying fractured pieces.

The portion having the larger sheet thickness should preferably be at least a portion facing an outer circumference of a turbine wheel of the turbine.

The portion facing at least the outer circumference of the turbine wheel of the turbine has an increased sheet thickness, i.e., the portion on the outer side of the turbine wheel is made thicker, which allows for efficient prevention of damage to the housing portion caused by flying fractured pieces, because the fragments of the wheel will fly outward in the event of a burst following an excessively high-speed rotation of the turbine rotor.

In the present invention, the sheet metal scroll member of the scroll part should preferably have a double wall structure. With the sheet material of the scroll part having a double structure, the scroll part has better impact resistance, so that, in the event of a burst caused by an excessively high-speed rotation of the turbine rotor, fractured pieces are reliably prevented from flying off to the outside through the scroll member.

The double structure also enables the functions of withstanding thermal stress from the internal gas and of preventing a gas leak to be served separately by the inner wall and the outer wall, whereby, a reduction in weight as well as attendant improvement in vibration resistance can be achieved, which further improves the impact resistance of the turbine housing.

The center core is made from a steel pipe member processed into an annular shape, whereby the material thickness is reduced and so is the thermal capacity, which provides the effects of speeding up the temperature rise of the turbine part, and promoting the warming of the exhaust gas purification system, thereby enabling efficient purification processing by the system.

As the material thickness is reduced, the turbocharger is more lightweight. Also, the steel pipe member can be produced at lower cost than conventional cast products.

BEST MODE FOR CARRYING OUT THE INVENTION

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

(First Embodiment)

The turbine housing according to the first embodiment of the present invention will be described with reference to FIG. 1 to FIG. 4.

Figure 1:
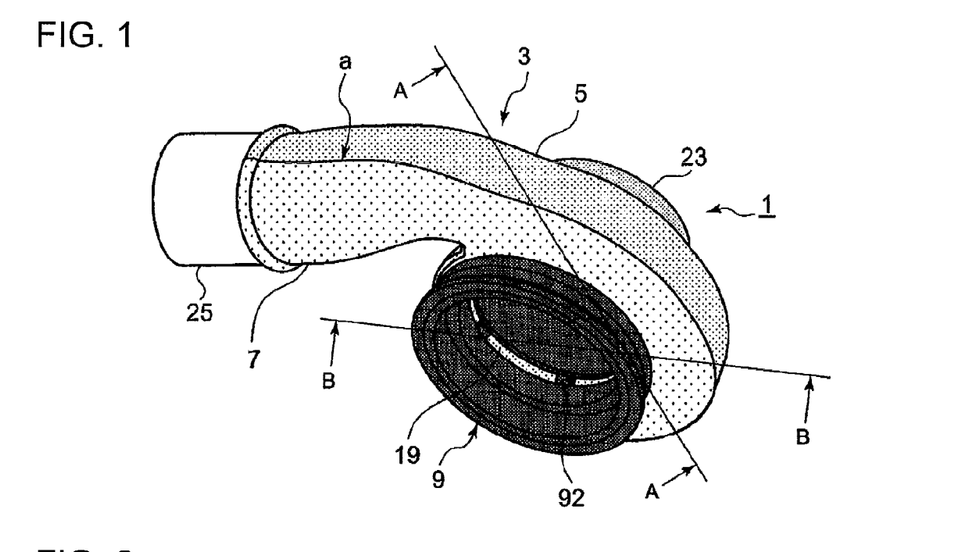
FIG. 1 is a perspective view illustrating the schematic structure of the turbine housing according to a first embodiment of the present invention.
Figure 2:
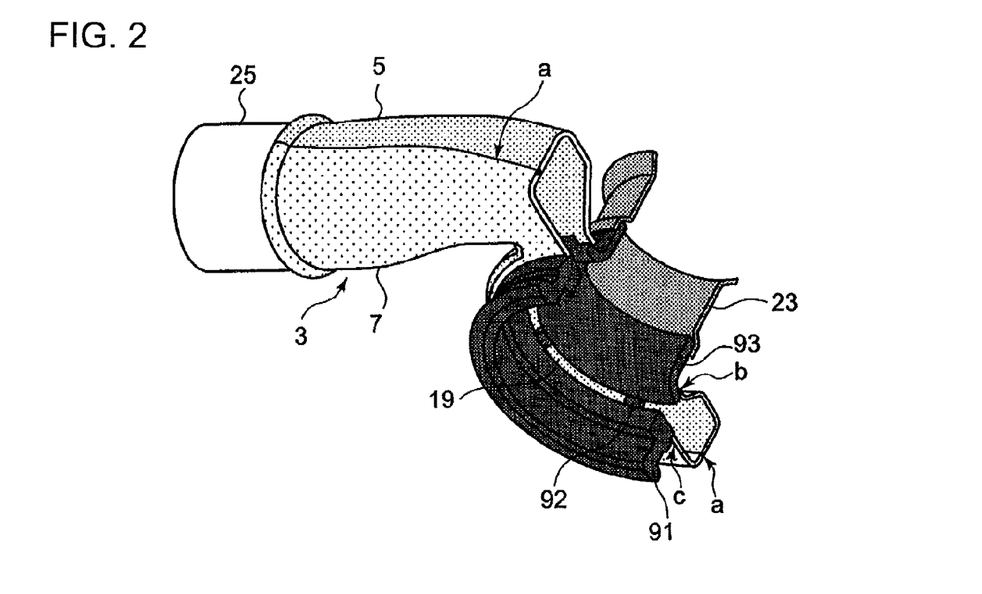
FIG. 2 shows a cross section of essential parts along A-A of FIG. 1.
Figure 3:
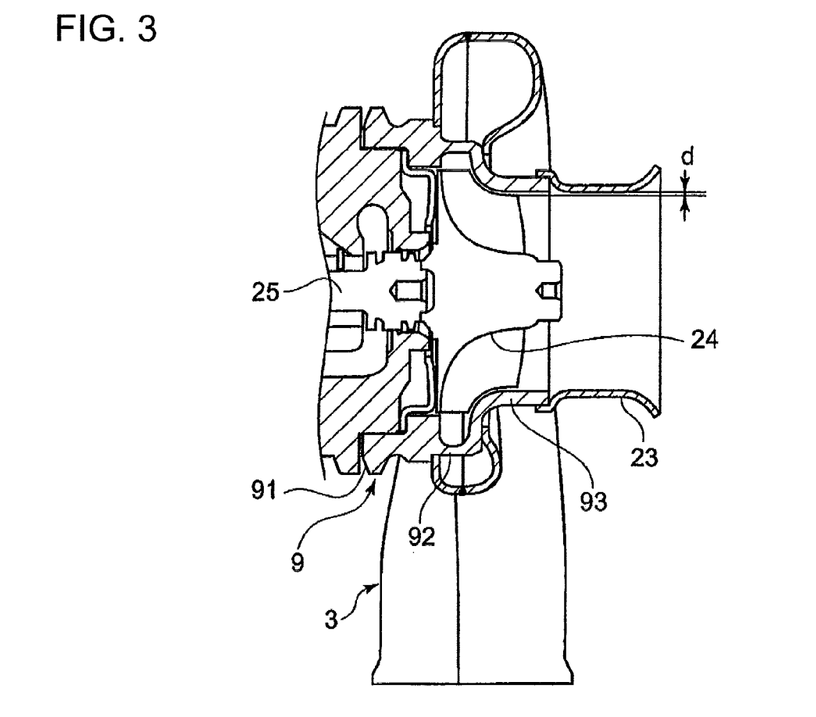
FIG. 3 shows a cross section of essential parts along B-B of FIG. 1, with a turbine wheel assembled therein.

As shown in FIG. 1 and FIG. 2, the sheet metal turbine housing 1 is roughly made up of a scroll part 3, a center core part 9, and an outlet pipe part 23, the scroll part 3 being formed by a first scroll part 5 and a second scroll part 7 butted opposite each other and welded together. The turbine housing 1 is formed by joining these four parts by welding.

The scroll part 3 that forms a spiral gas passage is formed by butting two parts, the first scroll part 5 and the second scroll part 7, and joining them along the butted portion all around by penetration butt welding.

The sheet metal parts are welded together not by one-side fillet welding but by penetration butt welding wherein the ends of the sheet metal parts are butted against each other and welded (part a).

The first scroll part 5 and the second scroll part 7 may be thin sheet metal parts made of heat resistant steel such as austenitic stainless steel or the like and formed in respective shapes.

The penetration butt-welded portion (a) runs along the outer circumference of the scroll part 3, at an intermediate position thereof in the axial direction of the turbine wheel 24.

Therefore, the scroll parts each have a sectional shape corresponding to that of the gas passage generally half split in the scroll direction.

In consideration of the pressure by the pulsed exhaust gas flows from the engine applied to the outer circumferential wall surface of the scroll part 3, the weld joint structure of the outer circumferential part of the scroll part 3 is formed by penetration butt welding which is advantageous in withstanding tensile stress, so that the weld joint has higher durability and reliability.

A lap joint welded along the edge on one side by fillet welding as in a conventional structure may be less durable and reliable when the pressure of the exhaust gas is applied orthogonally to the outer circumferential wall surface of the scroll part 3, as the pressure acts to bend the welded ends, whereby a force may act to peel the welded edge of the overlapped sheet metal parts and stress concentration may occur.

At the volute center of the scroll part 3 is the center core part 9, which is generally cylindrical as a whole, and includes a bearing receiving portion 91 at the other end in which a bearing for supporting a rotating shaft 25 of the turbine wheel 24 (see FIG. 3) is fitted, a housing portion 93 formed at one end such as to surround the outer circumference of the turbine wheel 24 and to form a gas discharge port, and a plurality of circumferentially spaced supports 92 bridging a gap between the bearing receiving portion 91 and the housing portion 93, these all being formed integrally. The center core part 9 can be formed easily by machining with a multiple axis tool.

A center core part 9 similar to that of the first embodiment may be fabricated also from a solid bar material cut into a steel pipe shape.

As the center core part 9 is produced by a machining process, it is finished with close dimensional tolerance, and therefore the clearance d (FIG. 3) between the center core part and the outer circumference of the turbine wheel 24 can be reduced, which will reduce the amount of exhaust gas leaking through the clearance d and improve the power for driving the compressor wheel (not shown) coaxially coupled to the turbine wheel 24, i.e., the overall performance of the turbocharger will be improved.

Moreover, as the center core part 9 is a steel pipe member and has high material strength, it can have smaller thicknesses in various parts and thus is more lightweight.

The center core part 9 having various parts made thinner has a lower heat capacity, and therefore heats up quickly by the exhaust gas. The center core part 9 can thereby prevent a drop in the temperature of exhaust gas soon after the engine is started, to promote the warming of the catalyst in the exhaust gas purification system disposed downstream of the exhaust gas system, allowing for effective and speedy purification of gas.

Moreover, as the center core part 9 is formed in one piece from a steel pipe member by machining, no additional welding work is necessary. Also, a considerable cost reduction is possible by automatic control of the multiple axis tool in the machining process.

The plurality of circumferentially spaced supports 92 are provided to the center core part 9 on the outer side of the turbine wheel 24 so as to secure flow passages 94 for the gas in the scroll part 3 to flow smoothly in the spiral direction toward the center, as well as to connect the bearing receiving portion 91 and the housing portion 93.

Figure 4:
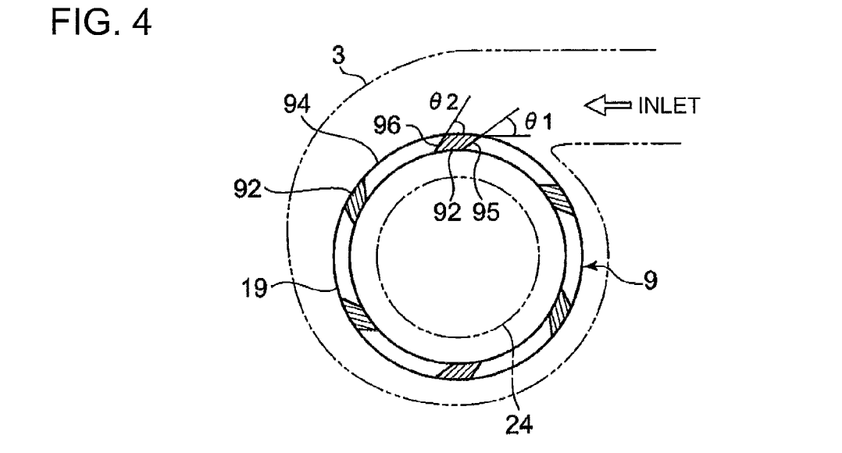
FIG. 4 is a cross-sectional diagram for explaining the part with supports.

FIG. 4 illustrates the cross-sectional shape of the plurality of circumferentially arranged supports 92 as viewed from the axial direction of the turbine wheel 24. The supports 92 are formed by removing material of the generally cylindrical center core part 9 (see FIG. 2) having the bearing receiving portion 15 and a flow passage outlet part 17 by machining, e.g., cutting, between portions that will be the supports 92 so that the flow passages 94 are formed therebetween.

The support 92 includes a flat surface on a side face 95 upstream of the exhaust gas flow and a flat surface on a downstream side face 96, with an upstream inclination angle θ1 (acute angle) and a downstream inclination angle θ2 (acute angle) in a cross section as viewed from the axial direction of the turbine wheel 24. For example, the upstream inclination angle θ1 may be about 20°, and the downstream inclination angle θ2 may be about 70°.

If θ1 is less than 20°, then the cross-sectional shape of the support will be too flat, and, in order to secure a cross-sectional area that can provide necessary strength, the cross-sectional area of the flow passages 94 between the supports 92 will have to be made smaller. If θ1 is more than 70°, a reduction in the projected area of the support 92 as seen from the flow direction will not be possible, because of which the effect of reducing the gas flow loss caused by the supports 92 and of reducing generation of wakes (fluid distortion) cannot be achieved. The acute angle range is therefore preferably from 20° to 70°. The above applies not only to the upstream inclination angle θ1, but also to the downstream inclination angle θ2.

As the support 92 has a generally rectangular upstream side face 95 and downstream side face 96, the material between the portions that will form the supports 92 can be readily removed by a cutting process, i.e., the supports 92 can be formed or fabricated easily by machining.

The support 92 is formed to have a generally rectangular cross-sectional shape, with the upstream corner having the angle θ1 and the downstream corner having the angle θ2 so that the upstream side face 95 and the downstream side face 96 are inclined along the flow of gas. The flow resistance of the exhaust gas passage is therefore lower than that with the conventional rectangular cross-sectional design, and thus the gas flow loss caused by the supports 92 and generation of wakes (fluid distortion) can be reduced.

The supports 92 connecting the bearing receiving portion 91 and the housing portion 93 also have strength and heat resistance sufficient for maintaining the clearance between the turbine wheel 24 and the inner circumferential surface of the center core part 9 constant even under high temperatures or external forces.

To the distal end of the housing portion 93 is joined the tubular outlet pipe part 23 that is welded thereto all around.

The first scroll part 5 is welded all around to the outer circumference of the joint between the housing portion 93 and the supports 92 (weld joint b), which is at one end of the center core part 9. The second scroll part 7 is welded all around to the outer circumference of the joint between the bearing receiving portion 91 and the supports 92 (weld joint c), which is at the other end of the center core part 9. Thus the scroll part 3 and the center core part 9 are made into one piece.

The bearing receiving portion 91, the housing portion 93, and the supports 92 connecting these are integrally formed, i.e., the bearing receiving portion 91, housing portion 93, and supports 92 are formed in one piece by a cutting process.

While the supports 92 in FIG. 4 are circumferentially generally equally arranged, they may be arranged irregularly depending on the scroll shape or other factors, to achieve desired turbocharger performance.

(Second Embodiment)

Next, the second embodiment will be described with reference to FIG. 5.

Figure 5:
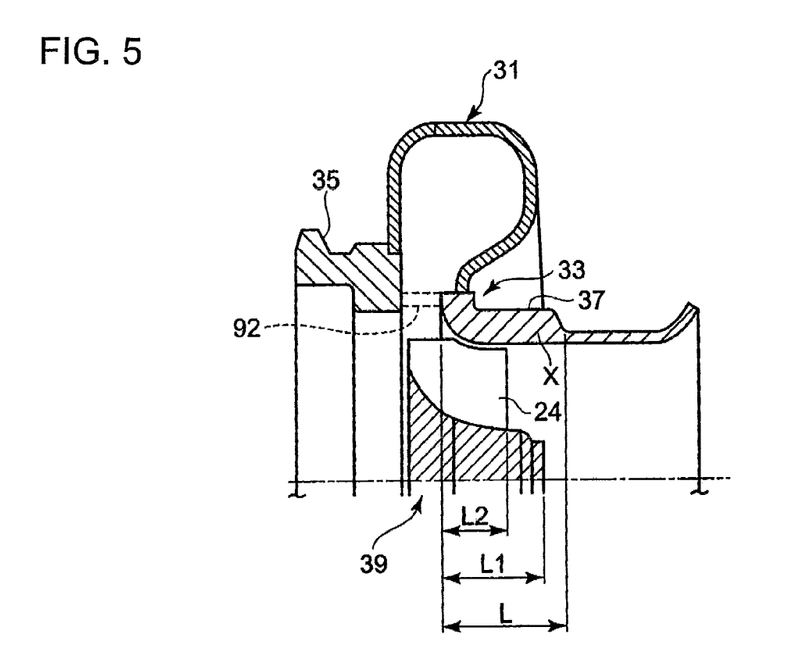
FIG. 5 is a cross-sectional view of essential parts illustrating a second embodiment and corresponding to FIG. 3.

Elements that are the same as those of the first embodiment are given the same reference numerals in FIG. 5. At the volute center of the scroll part 31 is the center core part 33, which is generally cylindrical as a whole, and includes a bearing receiving portion 35 in which a bearing for supporting the rotating shaft of the turbine wheel 24 is fitted, a housing portion 37 that surrounds the outer circumference of the turbine wheel 24 to form a gas discharge port, and a plurality of circumferentially spaced supports 92 bridging a gap between the bearing receiving portion 35 and the housing portion 37, these all being formed in one piece.

This center core part 33 is made of the same material and produced by the same method as that of the first embodiment described in the foregoing.

Although the configuration of the second embodiment shown in FIG. 5 does not include the outlet pipe part 23 of the first embodiment, it goes without saying that there may be the outlet pipe part 23 further connected to the distal end of the housing 37 in FIG. 5.

The characteristic feature of the second embodiment, as shown in FIG. 5, is that the housing portion 37 has its sheet thickness varying in the axial direction and includes a thick portion X. The length L of this thick portion X is defined by a length from one end on the side of the exhaust gas passage where the supports 92 are formed.

The other end of the thick portion X should preferably extend to a length that includes the length L1 of the turbine 39 inside the housing portion 37 to its axial end, or at least the length L2 of the turbine wheel 24 part to its axial end, in order to achieve effective impact resistance of the turbine housing without too much increase in weight that accompanies the increase in sheet thickness.

Figure 6:
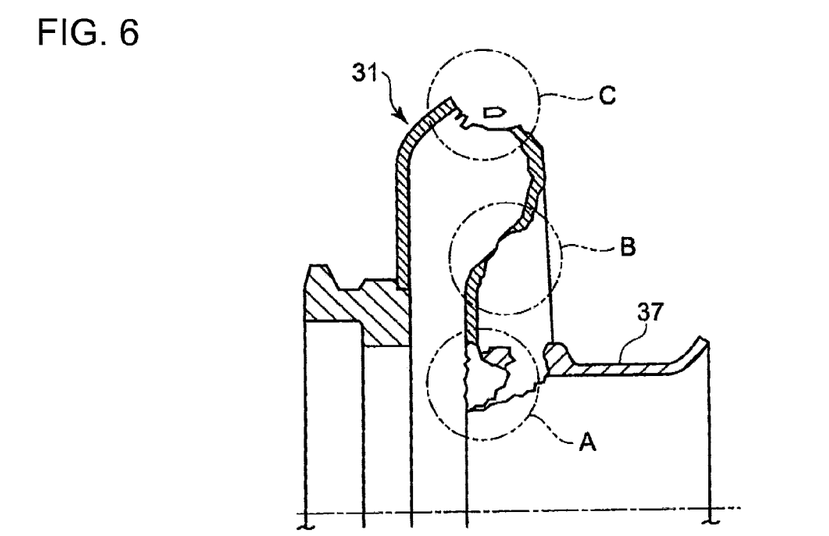
FIG. 6 illustrates a failure mode wherein fractured pieces fly off through the scroll member to the outside.

There is a possibility of the turbine wheel 24 (turbine rotor) rotating at excessively high speeds and bursting, in which case fractured pieces will fly off and hit the housing portion 37. The fragments of the turbine wheel 24 in this case will first hit a part A of the housing portion 37 facing the outer circumference of the turbine wheel 24 as shown in FIG. 6, whereby the kinetic energy of the fragments is absorbed. The amount of energy absorbed by the part A is about 70% of the kinetic energy of the fragments of the turbine wheel 24.

The next stage is energy absorption through fracture of a part B on the radially inner side of the scroll part 31. The part B absorbs about 25% of the kinetic energy.

This is followed by further energy absorption through fracture of a part C of the scroll part 31. The part C absorbs about 5% of the kinetic energy.

Figure 7:
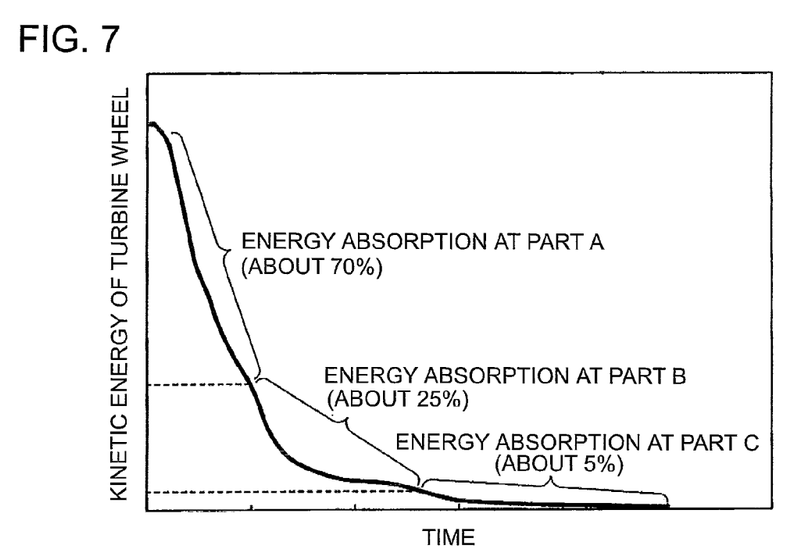
FIG. 7 shows changes with time of kinetic energy of the turbine wheel.

FIG. 7 shows the changes with time in kinetic energy absorbed through fracture of the parts A, B, and C as the fragments of the turbine wheel 24 hit the respective parts. The results were obtained through analysis. As shown in FIG. 7, the thick portion X of the housing portion 37 absorbs about 70% of the energy, the part B on the radially inner side of the scroll part 31 absorbs about 25% of the energy, and the part C in the main part of the scroll part 31 absorbs about 5% of the energy, so that there remains no energy at the end and thus the fragments are prevented from flying off to the outside.

The thickness and length of the thick portion X of the housing portion 37 therefore need to be designed so that the thick portion X will be capable of absorbing about 70% or more of the kinetic energy of the turbine wheel 24. As mentioned above, the axial length needs to contain at least the axial length L2 of the turbine wheel 24, preferably the axial length L1 of the turbine part 39, in consideration of the traveling direction of fragments of the turbine wheel 24.

With the second embodiment, as described above, the thickness and others of the turbine housing are designed so as to ensure its impact resistance, such that all the kinetic energy of the turbine wheel 24, in the event of a burst following an excessively high-speed rotation of the wheel, will be absorbed by the housing portion 37 and the scroll part 31, whereby fragments of the turbine wheel 24 are prevented from flying off to the outside of the housing portion 37.

The thick portion X is provided at least in a portion facing the outer circumference of the turbine wheel 24, i.e., the sheet thickness is increased only on the outer side of the wheel. In the event of a burst following an excessively high-speed rotation of the turbine wheel 24, the fragments will travel outwards from the turbine wheel 24. Therefore, increasing the sheet thickness in a portion that is most likely be subjected to damage can provide efficient containment of the fragments.

(Third Embodiment)

Figure 8:
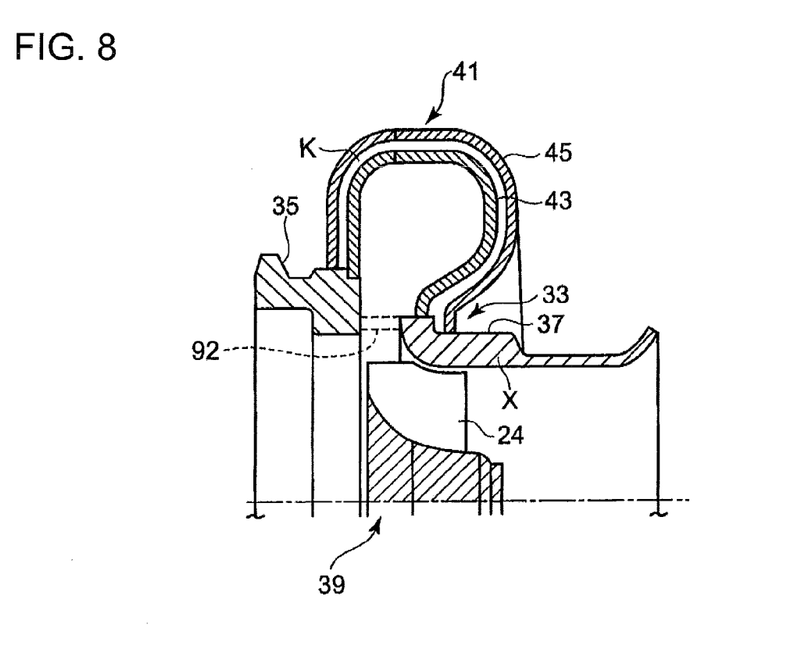
FIG. 8 is a cross-sectional view of essential parts illustrating a third embodiment and corresponding to FIG. 3.

Next, the third embodiment will be described with reference to FIG. 8. The third embodiment is characterized in that the sheet metal scroll member of the scroll part 41 has a double wall structure, unlike the structure in the second embodiment As shown in FIG. 8, the scroll part 41 is formed by an inner wall 43 and an outer wall 45, the inner wall 43 serving a function of withstanding thermal stress from the internal gas, and the outer wall 45 serving a function of preventing a gas leak.

An air layer K is present between the inner wall 43 and the outer wall 45 to form an insulation layer.

With such a double wall structure, the part C can absorb more energy through fracture, and the amount of energy absorbed by the part C is about 25% in the third embodiment, as compared to the scroll part 31 having a single wall structure in the second embodiment. As a result, the thick portion X need only have a sheet thickness and a length to be able to absorb about 60% or more of the energy.

With the third embodiment, as described above, the sheet material of the scroll part 41 has a double structure so that the scroll part 41 has better impact resistance, whereby the fragments of the turbine wheel 24 are reliably prevented from flying off to the outside through the scroll part 41 during a burst following an excessively high-speed rotation of the wheel.

The double structure enables the functions of withstanding the thermal stress from the internal gas and preventing a gas leak to be separately served by the inner wall 43 and the outer wall 45, so that a scroll part capable of both reducing thermal stress and preventing a leak can be obtained. This leads to a reduction in weight and better turbocharger performance, and better impact resistance of the turbine housing.

INDUSTRIAL APPLICABILITY

According to the present invention, the bearing receiving portion, the flow passage outlet part, and the supports of the center core part that is disposed at the center of the scroll part are formed in one piece from a steel pipe member, so that the invention is suitably applied to a turbine housing structure, for minimizing a drop in the exhaust gas temperature, for preventing changes in tip clearance caused by thermal deformation of the scroll main body, for reducing weight and cost, and for improving durability, reliability, and impact resistance.

The invention claimed is:

1. A sheet metal turbine housing mounted downstream of an engine exhaust manifold, comprising:
   a spiral scroll part in which an exhaust gas flows so as to drive a turbine, the spiral scroll part including a first sheet metal scroll part having a first end surface extending in a thickness direction of a first sheet metal forming the first sheet metal scroll part and a second sheet metal scroll part having a second end surface opposing the first end surface and extending in a thickness direction of a second sheet metal forming the second sheet metal scroll part, and a penetration butt welded part that joins the first and second surfaces along an entire circumferential portion of the scroll spiral part; and a center core part, substantially cylindrical in shape, and disposed in a volute center part of the spiral scroll part, the center core part includes:
- a housing portion at one end which surrounds an outer circumference of a turbine wheel via a clearance and which forms a gas discharge port;
- a bearing receiving portion at another end which is opposite to the one end and in which a bearing axially supporting a rotating shaft of the turbine wheel is fitted; and
- a plurality of circumferentially spaced supports bridging a gap between the housing portion and the bearing receiving portion in an axial direction of the rotating shaft of the turbine wheel, wherein the housing portion, the bearing receiving portion, and the plurality of circumferentially spaced supports are formed integrally in one piece from a steel pipe member in an annular shape by machining.

2. The sheet metal turbine housing according to claim 1, wherein each of the plurality of circumferentially spaced supports have a cross-sectional shape, as viewed from the axial direction of the rotating shaft of the turbine wheel, with acute-angled corners both upstream and downstream of a flow of exhaust gas so that the plurality of circumferentially spaced supports have an upstream side face and a downstream side face inclined with respect to the flow of gas.

3. The sheet metal turbine housing according to claim 1, wherein the housing portion surrounding the turbine wheel has a larger sheet thickness in a portion facing an outer circumference of the turbine wheel than in other portions.

4. The sheet metal turbine housing according to claim 3, wherein the housing portion having the larger sheet thickness is at least a housing portion facing an outer circumference of the turbine wheel of the turbine.

5. The sheet metal turbine housing according to claim 1, wherein each of the first sheet metal scroll part and the second sheet metal scroll part of the spiral scroll part has a double wall structure.

6. The sheet metal turbine housing according to claim 2, wherein each of the first sheet metal scroll part and the second sheet metal scroll part of the spiral scroll part has a double wall structure.

7. The sheet metal turbine housing according to claim 3, wherein each of the first sheet metal scroll part and the second sheet metal scroll part of the spiral scroll part has a double wall structure.

8. The sheet metal turbine housing according to claim 4, wherein each of the first sheet metal scroll part and the second sheet metal scroll part of the spiral scroll part has a double wall structure.

9. The sheet metal turbine housing according to claim 1, wherein each of the first sheet metal scroll part and the second sheet metal scroll part of the spiral scroll part has a sectional shape corresponding to the sectional shape of the spiral scroll part generally half split in the scroll direction.

10. The sheet metal turbine housing according to claim 9, wherein each of the first sheet metal scroll part and the second sheet metal scroll part of the spiral scroll part has a double wall structure.

* * * * *